JAMES G. MINER.
Improvement in Plows.
No. 115,629.  Patented June 6, 1871.
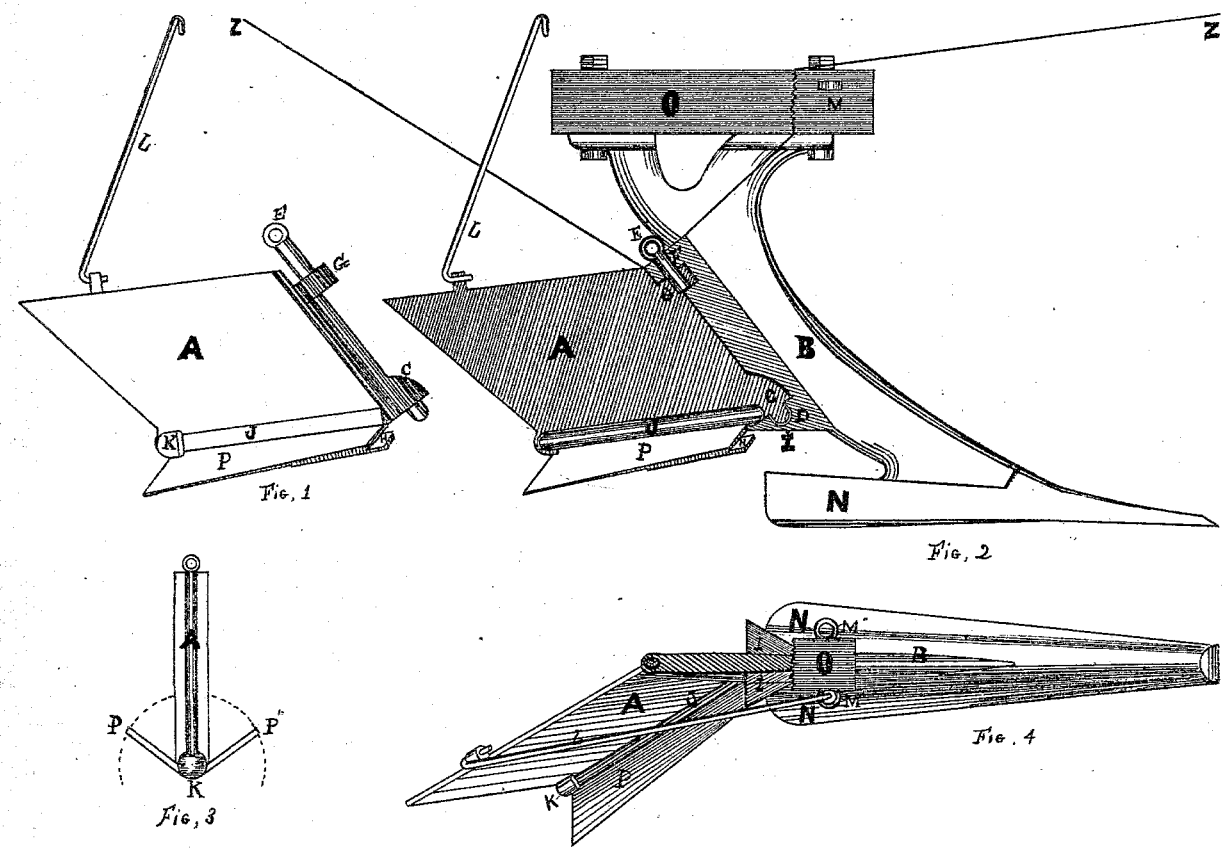
WITNESSES
Jas. H. Sweeny
Robt. C. Collier
INVENTOR
J. Miner 115,629

UNITED STATES PATENT OFFICE.

JAMES G. MINER, OF NASHVILLE, TENNESSEE.

IMPROVEMENT IN PLOWS.

Specification forming part of Letters Patent No. 115,629, dated June 6, 1871.

*To all whom it may concern:*

Be it known that I, JAMES G. MINER, of Nashville, in the county of Davidson and State of Tennessee, have invented certain new and useful Improvements in Plows, of which the following is a specification:

Object of the Invention.

The object of my invention is to produce an implement capable of performing practically in all ordinary situations the duties now requiring three different implements—viz., the subsoil, the ordinary or level-land turning, and the hill-side plows; and in order to present my invention in a manner that its novelty may be observed, and to avoid complication in the general description thereof, I will now describe what is necessary in the construction of each of the above-named implements to render them capable of performing their respective duties.

Commencing with the subsoil-plow, this, as its name indicates, is an implement designed to penetrate deep into the ground, and plow or loosen up the subsoil which cannot be reached in process of plowing with the ordinary turning-plow. It is necessarily narrow and sharp, with a comparatively long colter, as it is often required to penetrate the earth from ten to twenty inches below the surface thereof. The level-land turning-plow differs in construction from the subsoil-plow in almost every particular, being broad, and intended only to penetrate a few inches into the soil and turn over the same, forming a broad shallow furrow. This turning of the soil is effected by the mold-board—a wing placed at a proper deflecting angle with the center of the beam. It has a point or shear extending out from the bottom a given distance to the front, which separates and opens the soil through which the remainder of the implement passes. The next essential part of the turning-plow is the land-side—a plain vertical piece placed parallel with the beam upon the opposite side from the mold-board, and, coming in contact with the side of land not being turned, prevents lateral motion in that direction. In order to keep the land-side of the plow next the unplowed earth, and the mold-board to the previously-turned furrow while plowing, the furrow is commenced at the border of the land and followed around like one continuous furrow until the center is reached and to accomplish this upon level ground there is no difficulty manifested. Side-hill plowing is an operation differing from that last described, as the furrow has to be commenced horizontally across the foot of the hill, and, every additional furrow being formed parallel thereto, the soil forming each of which has to be turned in one constant direction toward the bottom of the hill. The plow for performing this operation has to be capable of reversal, so as to turn the soil either to the right or to the left of said implement, by which means a returning furrow may be commenced beside the termination of the one previously completed.

Nature of the Invention.

The nature of my invention consists in attaching to the rear of the colter of a subsoil-plow a mold-board, so arranged as to be capable of turning the soil either to the right or to the left of said implement, the same being hinged thereto in such a manner that if vibrated to the right or left a given distance it assumes the proper angle with the center of the beam to turn the soil in the direction thereof. The bottom of said mold-board is provided with an oscillating shaft, to which are rigidly attached two wings sitting upon an obtuse angle with each other, one of which is to form a point or shear for the mold-board while turning a furrow in either direction, as will be hereafter described; and to prevent lateral motion I sufficiently increase the length of the mole or point of the aforesaid subsoil-plow to the rear of the colter thereof, or substitute in its stead a land-side, which will answer the same purpose.

Description of the Accompanying Drawing.

Figure 1 is a side view of the mold-board and its connections. Fig. 2 is a sectional view of said mold-board as in connection with the rear of the colter of a subsoil-plow, and represents in outline the oscillating shaft as attached, and one of the wings in connection therewith. Fig. 3 is a rear-end view of the mold-board and oscillating wings with the points of the latter sitting at equal distances from their respective sides of the mold-board.

Fig. 4 is a top view of my implement from the line z z, showing the mold-board as vibrated, or set to form a right-hand plow.

General Description.

A is the mold-board, hinged to the rear of colter B by means of the stationary pin at the bottom of lug C, which fits into a receptacle in lug D, the upper portion of the mold-board being connected in a similar manner. Portable pin E is slipped through lugs F and G, as shown in Fig. 2 of my drawing. Lug D is provided at the bottom with a flat horizontal triangular piece, I, widening at the rear, forming a continuation of the oscillating wings P at either side, and conveys the same to a point at the side of colter B. Lug C is hollowed out to receive one end of oscillating shaft J, which rests upon lug D, which is slightly concaved, while the other end of shaft J is received by lug K. H is a lug formed at front, under side of said wing or wings P, and slips under the rear of I to form a lock at that point, when the rod L is hooked in one of the eyes M, which secures the mold-board to either the right or left side of the colter B, the opposite wing being brought at the same time against its respective side of the mold-board, thus forming a ridged point or share for said mold-board. N is that portion of the mole or point of the subsoil-plow which is intended to extend to the rear of colter B a sufficient distance to prevent lateral motion. O is a section of beam to which the eyes M are attached.

Operation.

The subsoil portion of my implement enters the ground as in the ordinary manner, which is to a depth exceeding that required of a turning-plow. This breaks and opens the soil, a portion of which is then turned over by the mold-board A, and as, instead of coming in contact with solid earth, as in ordinary plowing, the said mold-board has only to encounter loose soil, which will have been pulverized by the portion of the implement in advance of the mold-board, which turns with comparative ease, hence requiring a very slight increase of power to perform both operations. The operation of reversing the mold-board so as to constitute a right or left hand plow is simple. The rod L has to be released from either of the eyes M and hooked into the similar eye upon the opposite side, after swinging said mold-board around to the position desired, and care being taken to enter lug H properly underneath the piece I of lug D; and in performing the latter operation the opposite oscillating wing is forced against its respective side of the mold-board A, rendering it thus no incumbrance to that side in passing through the earth, which is the object of this oscillating contrivance, as, were the bottom of said mold-board provided with two stationary shears, the one upon the back of the mold-board would drag below the cut of that operating at the front of the same and tend to raise the implement out of the ground.

It may here be stated that many forms of mold-boards may be attached to the rear of the colter of a subsoil-plow in the manner I have described, and may also be raised and lowered so as to subsoil at a greater or lesser distance below the same, and that a right or left stationary mold-board may be employed instead of the vibrating one described above, to meet the requirements of certain circumstances.

It may also be stated the oscillating wings or shears at the bottom of the mold-board may be arranged in various ways to carry out the design for which they are intended; therefore

What I claim as my invention, and desire to secure by Letters Patent of the United States, is—

1. The combination of the full-turning mold-board with the rear of the colter of a subsoil-plow for the purposes above set forth, and constructed and operating as described, and this whether the same be attached to the colter in manner herein described or is made stationary thereon.

2. The oscillating shaft J and wings P, constructed and arranged substantially as and for the purpose above set forth.

3. The mole N, elongated at the rear of the colter B, substantially as and for the purpose above set forth.

4. The combination of the mold-board A, colter B, lugs C, D, F, G, H, and K, pin E, parts I, shaft J, wings P, rod L, eyes M, and beam N, substantially as and for the purposes set forth.

J. G. MINER.

Witnesses:
ROBT. C. COLLIER,
JAS. H. SWEENY.